June 8, 1954
N. B. HIRSCHFELD
2,680,254
COMBINED DRILL AND MARKING DEVICE
Filed March 27, 1952
FIG. 3.
FIG. 2.
FIG. 1.
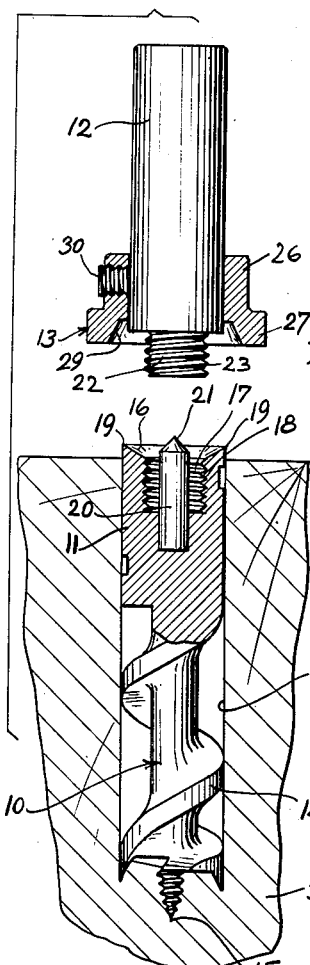
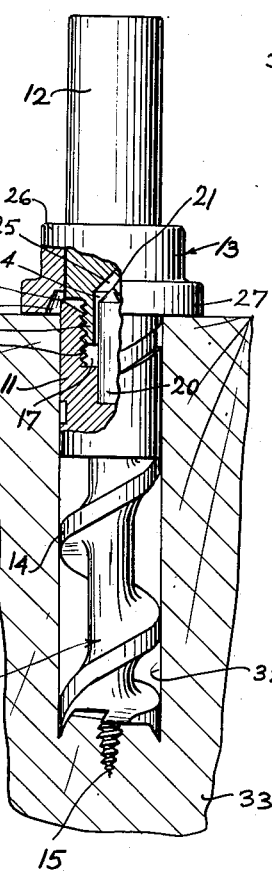
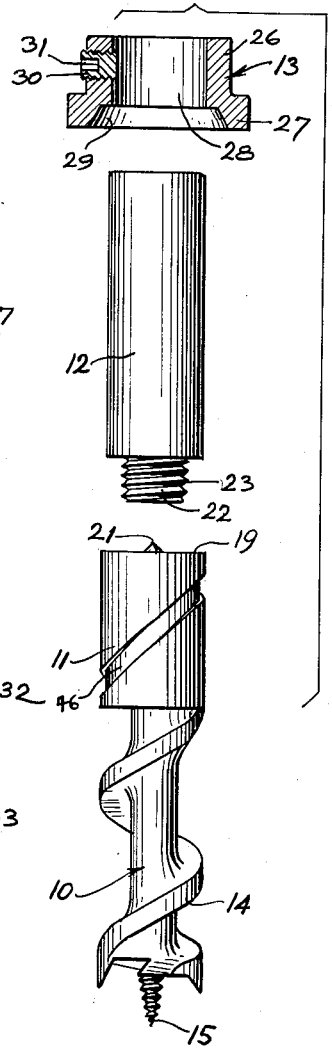
FIG. 4.
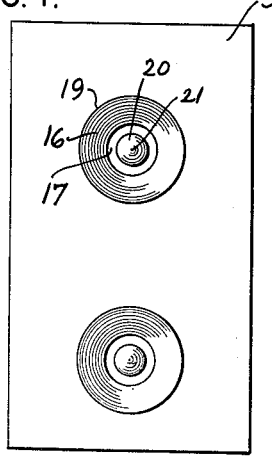
FIG. 5.
INVENTOR.
NATHAN B. HIRSCHFELD
BY Mock & Blum
ATTORNEYS Patented June 8, 1954

2,680,254

UNITED STATES PATENT OFFICE 2,680,254

COMBINED DRILL AND MARKING DEVICE

Nathan B. Hirschfeld, New York, N. Y.

Application March 27, 1952, Serial No. 278,923

6 Claims. (Cl. 7—14.1)

My invention relates to an improved combined drilling and marking device which is particularly suitable for use in carpentry.

In carpentry, it is common practice to secure two pieces of wood together by placing dowel pins in alined holes of the respective pieces. The holes must be placed accurately in order to ensure proper alinement. In one method a hole is first drilled to a specified depth in the first piece, and a temporary marking element of a length corresponding to the depth of the hole is inserted therein. The second piece is then placed in the desired position of registration with the first piece, so that the marking element marks the spot on the second piece for the corresponding hole. It is important for accurate work that the first hole be drilled to exactly the proper depth corresponding to the length of the marking element. However, because of the presence of wood chips and wood dust in the hole, it is uncertain that the marking element will be located precisely as desired relative to the surface of the first piece when inserted in the hole, even though the hole was initially drilled to the proper depth.

My improved device comprises a separable drill chuck and drill bit, the bit also serving as the marking element and the chuck carrying an adjustable collar to ensure that the hole will be of the proper depth relative to the marking element.

The bit has a threaded recess in its upper face, the upper face being so cut that only a circular rim remains. A marking element having an upstanding point is located in the recess and is co-axial therewith. The chuck has a threaded extension which may be screwed into the recess, said extension having a further recess which receives the marking element. The collar is adjusted on the chuck so that when it strikes the piece of wood being drilled, thereby stopping the drilling, the point of the marking element and the rim of the upper face of the bit protrude above the face of the wood just enough to make an impression on the second piece of wood. The extent of this protrusion is varied by adjustment of the collar, depending upon the hardness of the wood being marked. The chuck is then unscrewed from the bit, which remains in the hole. The second piece of wood is then marked by bringing it into registration with the first piece, after which the bit is removed.

My device thus ensures the hole in the first piece being automatically drilled to the proper depth and eliminates the need for placing a separate marking element in the hole. This saves a great deal of time for the operator.

Another important advantage of my invention is that the marking device is automatically set into the hole to the proper depth merely by drilling the hole. There is no need for withdrawing the drill and inserting a separate marking element in the hole, with the settling of wood chips and wood dust in the bottom of the hole, resulting from withdrawal of the bit making it possible that the marking element will not fit properly in the hole.

Other objects and advantages of my invention will become apparent from the following description, in conjunction with the annexed drawing, in which a preferred embodiment is shown.

In the drawing,

Fig. 1 is an exploded front view of my improved combined drilling and marking device, the collar for the chuck being shown in vertical section;

Fig. 2 is a front view of the assembled drill, partly in vertical section, showing the bit embedded in a hole in a first wood piece;

Fig. 3 is a view similar to Fig. 2 but showing the chuck removed preparatory to marking a second wood piece;

Fig. 4 is a top plan view showing two drills embedded in the first wood piece, with their chucks removed; and Fig. 5 is a bottom plan view of the second wood piece after it has been marked by placing it upon the surface of the wood piece of Fig. 4.

Upon reference to the drawings in detail, it will be seen that they show a combined drilling and marking device comprising bit 10, bit shank 11, chuck 12 and collar 13.

Shank 11 has a cylindrical peripheral wall which has a spiral peripheral groove 46 extending the entire length thereof. Bit 10 depends from shank 11 and is integral and coaxial therewith. Bit 10 has the usual threaded point 15 and the usual spiral cutting flutes 14, with a spiral channel between flutes 14 which communicates with groove 46 to provide a path for the upward movement of shavings while a hole is being drilled.

Chuck 12 is separable from shank 11. Shank 11 has a recess 16 in its top face. The top face of shank 11 is substantially cut away by said recess 16 until only a substantially circular rim 19 remains. The upper edge of rim 19 serves as a marking edge and may optionally be sharpened. Recess 16 is substantially in the shape of an inverted frustro-cone.

Recess 16 is co-extensive at its lower end with an axially extending, cylindrical recess 17 which is closed at its lower end. The peripheral wall of recess 17 is threaded with screw-thread 18.

I provide a marking element 20 which has a cylindrical shank whose lower end is embedded in shank 11 below recess 17. The shank of marking element 20 extends axially upwardly through recess 17 into recess 16. Marking element 20 has a conical point 21 which is integral with the top of the shank thereof. Optionally and preferably, the apex of conical point 21 is positioned slightly above the plane of cutting edge 19. The apex of point 21 is located on the axis of shank 11.

Chuck 12 is of any suitable shape to fit within the jaws of the drill-holder. Preferably, chuck 12 is substantially cylindrical in shape. Chuck 12 has a depending, co-axial screw portion 22 of reduced diameter, whose outer peripheral wall is preferably cylindrical and is threaded. Chuck 12 and shank 11 may be assembled by screwing screw portion 22 into recess 17, screw threads 23 and 18 being interfitting. The diameter of bit shank 11 is slightly greater than the diameter of chuck 12. Chuck screw 22 is screwed into recess 17 until the lower peripheral edge of the body of chuck 12 abuts the peripheral wall of recess 17, as is clearly shown in Figs. 2 and 3. The threading 18 extends below screw portion 22, so that the latter will not bind in recess 17 and can be readily unscrewed. Optionally, other means for interfitting extension 22 in recess 17 may be provided.

In order to receive marking element 20, chuck 12 has a co-axial, cylindrical recess 24 which extends upwardly from the bottom face of screw portion 22 and which is of greater diameter than marking element 20. Recess 24 extends upwardly into the main portion of chuck 13 and is tapered at its upper portion 25. When chuck 12 and shank 11 are assembled, the upper part of marking element 20 extends into recess 24, and tip 21 may extend into recess portion 25.

The depth of the hole drilled by bit 10 depends upon the mounting of collar 13 on chuck 12, collar 13 being axially adjustable on chuck 12. Collar 13 has a substantially cylindrical body portion 26 which is integral at its lower end with a substantially cylindrical stop portion 27 of increased diameter. Collar body 26 has a cylindrical, axially extending bore 28 which extends into stop portion 27 and communicates with a recess 29 therein of increased diameter, said recess 29 extending to the lower face of stop portion 27.

Collar 13 is mounted on chuck 12 with the latter extending slidably and turnably through recess 29 and bore 28. I provide a set-screw 30 which extends through a suitably threaded, radially extending opening 31 in the peripheral wall of collar body 26. Said screw 30 may be turned until it frictionally abuts chuck 12, to lock collar 13 in the desired axial position with respect to chuck 12.

In order that rim 19 will extend above the hole drilled by bit 10, recess 29 is of greater diameter than bit shank 11, so that the lower face of stop portion may extend below rim 19.

The operation of the device is as follows:

Collar 13 is mounted on chuck 12, and chuck 12 is screwed into bit shank 11. The axial position of collar 13 relative to chuck 12 is such that rim 19 and the tip of point 24 extend a slight distance above the lower face of stop member 27, this distance depending upon the type of wood to be marked and being generally greater for soft wood than for hard wood.

The assembled device is then mounted in a suitable holder, and a hole 32 is drilled in a first piece of wood 33, said hole 32 being transverse to the surface of piece 33. This is shown in Fig. 2. The drilling of hole 32 continues until the lower face of stop member 27 abuts the face of piece 33.

In the drilling of hole 33, stop member 27 optionally serves to help maintain the drill transverse to the wood. The diameter of stop member 27 is relatively wide, and it is possible to maintain a horizontal line of sight and to keep the lower face of stop member 27 within the line of sight and hence parallel to the upper face of the wood. Since stop member 27 is perpendicular to the axis of the drill, this ensures the drilling of a transverse hole in the wood.

As the next step, chuck 12 is unscrewed from shank 11, leaving the latter in hole 32. This is shown in Fig. 4. As is also shown in Fig. 4, I can optionally employ more than one of the drills in order to make a plurality of holes, each containing a marking device, prior to marking the second piece of wood.

Fig. 5 shows a second piece of wood 34, whose face has been forced against the face of piece 33. As a result, point 21 and rim 19, which extend above piece 33, cut a corresponding point 36 and circular groove 35 in piece 34, which mark the place at which the hole in piece 34 corresponding to hole 32 may be drilled. Shank 11 is then removed from hole 32.

While it is possible to eliminate marking element 20, or to make rim 19 a non-marking rim, the arrangement shown in the drawing is preferred. Optionally, collar 13 may be fixed to chuck 12.

An important feature of the invention resides in the manner in which collar 13 may be adjusted upon chuck 12 in order to control the depth of the hole, whereby to control the extent to which marking rim 19 and point 21 extend above the surface of the wood. The extent of protrusion of the marking element from the finished hole depends upon the readily measured axial distance between the lower face of collar 13 and marking rim 19. In contrast, if a separate marking element is used, it has been found necessary in practice to drill the hole and insert the marking element by trial and error, until the marking element protrudes above the hole to exactly the desired extent.

I have disclosed a preferred embodiment of my invention and have indicated various changes, omissions and additions which may be made therein. However, it will be apparent that various other changes, omissions and additions may be made in my invention without departing from the scope and spirit thereof.

I claim:

1. A drilling and marking device comprising a drill which has a cylindrical shank and a bit depending from said shank, said shank having a transverse face which has a shank recess whereby said face is in the form of a circular marking rim, the peripheral wall of said recess sloping inwardly, said shank recess communicating with a cylindrical, axially extending, screw-threaded recess, a cylindrical marking element embedded in said shank below said threaded recess and extending upwardly through said recesses and being spaced from the peripheral walls thereof, the free end of said marking element being tapered to provide a point whose tip is positioned above and proximate to the plane of said rim, a cylindrical chuck of smaller diameter than said shank which has a depending, cylindrical, axially extending, screw-threaded projection, the lower face of said projection having an axial recess therein, said chuck and said shank being releasably engageable by screwing said projection into said threaded recess with said marking element positioned slidably and turnably in said projection recess and with the lower edge of the peripheral wall of said chuck abutting the peripheral wall of said shank recess, and a collar which has a cylindrical bore through which said chuck extends slidably, said bore being of increased diameter at its lower end to fit around the peripheral wall of said shank, said collar carrying means for releasably locking it on said chuck with the lower face of said collar positioned below the plane of said rim.

2. A drilling and marking device comprising a bit, marking means carried by the upper end of said bit, a chuck, said chuck and said bit respectively carrying means for releasably interengaging same, and a stop member mounted on said chuck, said stop member having its lowest surface extending radially beyond the periphery of said bit and also extending below the level of said marking means.

3. A drilling and marking device comprising a drill, said drill comprising a cylindrical shank which has a depending bit, said shank having a transverse upper face which has a recess to form an annular marking rim in said upper face, a chuck which has a depending extension which is of a size and shape to fit within said recess, means for releasably retaining said extension within said recess, and a stop member mounted on said chuck, said stop member having its lowest surface extending radially beyond said shank and also extending below the plane of said rim.

4. A device in accordance with claim 3, in which said shank has a pointed marking rod which extends upwardly in said shank recess, said extension having a recess for receiving said marking rod when said extension and said shank are engaged, the tip of said marking rod being in approximately the same plane as said marking rim.

5. A device in accordance with claim 4, in which said stop member comprises a collar having a bore through which said chuck extends slidably, said collar having means for locking it to said chuck.

6. A device in accordance with claim 3, in which said stop member comprises a collar having a bore through which said chuck extends slidably, said collar having means for locking it to said chuck.

References Cited in the file of this patent

UNITED STATES PATENTS

| Number | Name | Date |
|---|---|---|
| 2,092,653 | Nielson | Sept. 7, 1937 |
| 2,500,653 | Berg | Mar. 14, 1950 |
| 2,570,945 | Hawkins | Oct. 9, 1951 |